Figures 1, 2, 3:
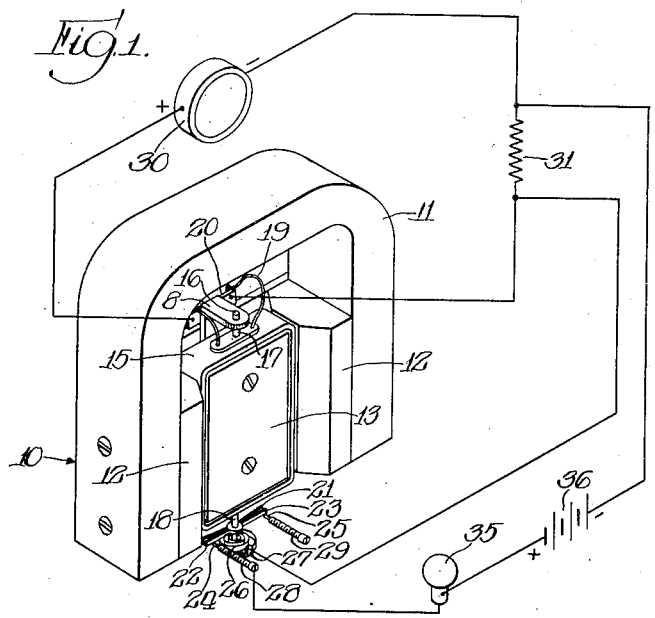

April 12, 1938.  A. J. McMASTER  2,113,737
RELAY SYSTEM
Filed Dec. 12, 1935   2 Sheets-Sheet 1

Inventor,-
Archie J. McMaster,
By John J. McLaughlin Atty.

April 12, 1938.  A. J. McMASTER  2,113,737
RELAY SYSTEM
Filed Dec. 12, 1935  2 Sheets-Sheet 2
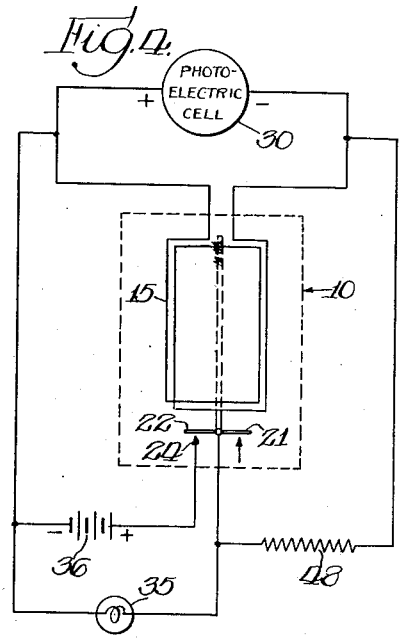
Fig. 4.
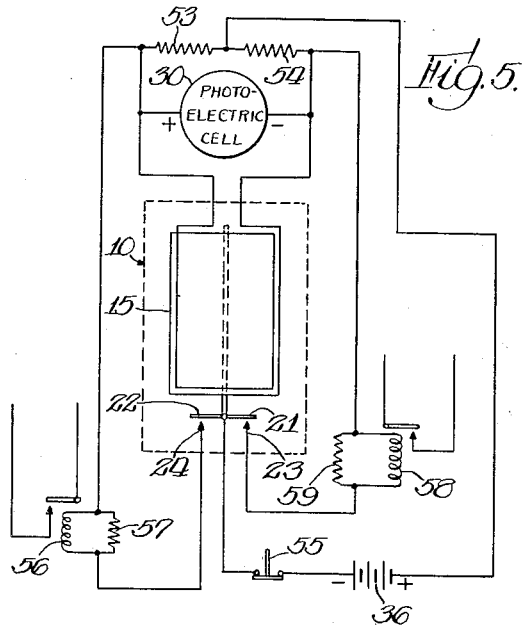
Fig. 5.
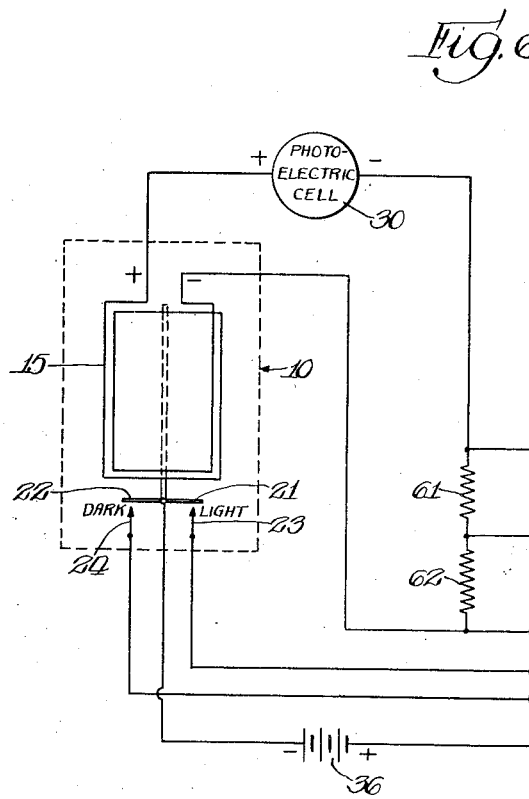
Fig. 6.
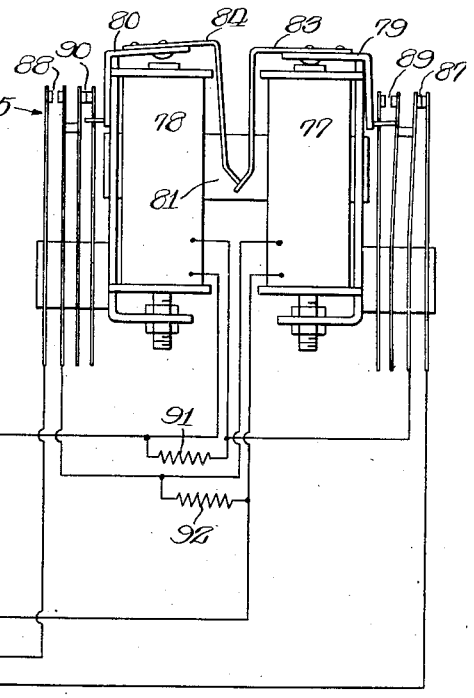
Inventor;
Archie J. McMaster,
By John J. McLaughlin Atty.

UNITED STATES PATENT OFFICE 2,113,737

RELAY SYSTEM

Archie J. McMaster, Highland Park, Ill., assignor to G-M Laboratories, Inc., Chicago, Ill., a corporation of Illinois Application December 12, 1935, Serial No. 54,032

9 Claims. (Cl. 175—320)

The present invention relates generally to circuits for electrical relays, and more particularly to circuits involving relays of the sensitive D'Arsonval type.

The D'Arsonval movement comprises a coil situated in a magnetic field and constrained to a rotary motion therein about an axis substantially perpendicular to the direction of the lines of magnetic force. The current through the coil reacts with magnetic field so that it tends to rotate the coil to such a position that the plane of the coil is also substantially perpendicular to the lines of magnetic force, the direction of the rotation being dependent upon the direction of the current in the coil. A spring is provided which tends to hold the coil in some pre-determined rest position when no current passes through the coil. This position is usually referred to as the position of zero current or simply as the "zero position". If the zero position is chosen somewhere between the two positions in which the plane of the coil is substantially perpendicular to the lines of magnetic flux, the coil will rotate against the torque of the spring out of the zero position when current is passed therethrough, the direction of rotation being dependent upon the direction of current through the coil. D'Arsonval movements are widely used in instruments, such as electric meters and electric relays where accuracy of operation is required and where only small amounts of electric power are available for operation of the instruments.

When D'Arsonval movements are used in sensitive relays, it is the practice usually to mount one contacting element on the coil structure so that it will rotate with the coil into engagement with a stationary contact element which serves also as a stop for the coil to limit its motion.

However, D'Arsonval movements have one serious defect when used for the operation of contacts, as in a sensitive relay. The inherent mode of operation of the movement is such that for each different amount of current through the coil, the coil assumes a different rotated position. The coil simply moves to such a position that the restoring torque exerted by the distended spring equals the torque resulting from the reaction of the magnetic field upon the current in the coil. When the rotation of the coil is not opposed by any rigid stop, there can be only one coil position corresponding to each value of coil current and only one value of coil current corresponding to each coil position. Consequently, if the current in the coil varies gradually, the coil rotates about its axis with a gradual motion, the coil assuming a different position for each different value of current.

As the contacts move slowly into engagement they at first engage with only slight pressure between them. As the current in the coil increases, the pressure upon the contacts increases because the coil is no longer able to move and therefore the additional torque exerted by the current in the coil must be opposed by the force between the contact surfaces.

Generally speaking, an appreciable amount of pressure is required between a pair of contacting surfaces in order to establish a good electrical connection, that is, a low resistance contact, between them. This is believed to be due largely to films of moisture, grease or the like which spread over the surfaces. The pressure exerted between the contact surfaces must be sufficient to cut through this film. In addition, there may be solid particles present which act to hold the two contact surfaces separated so as to prevent a good electrical connection between them. Usually, when the contact pieces of such a relay first come into engagement, the slight pressure between the contacts permits only a very small load current to pass therethrough, there being a considerable resistance in the film and other contamination which is present on the separate contact surfaces. This resistance may be reduced so as to permit a greater load current to flow by increasing the contact pressure, that is by increasing the current through the coil of the relay. Under some circumstances the load current will increase gradually with the contact pressure until a substantial maximum value of load current is reached. This constitutes the condition of a "good contact", that is, a low contact resistance. Under other conditions, as the contact pressure is gradually increased the load current increases in steps as though each increase in current resulted from the breakdown of an insulating film or particle. Furthermore, the amount of pressure required to obtain "good contact" varies widely from time to time, its magnitude depending apparently to some extent upon atmospheric conditions and certainly to a large extent upon the frequency of opening and closing the contacts. Since the contact pressure is determined by current in the relay coil the point of operation (measured in current through the coil of the D'Arsonval relay) of auxiliary apparatus controlled by the relay will be extremely erratic.

A similar erratic operation characterizes the value of coil current at which the contacts open indicating that there are forces present tending to hold them closed. Such forces could arise by virtue of adhesion of the separate contact surfaces due to an oily film or they could arise by virtue of the surface tension of a film extending from one contact piece to the other.

Another difficulty results from the fact that relays using movements of the D'Arsonval type inherently tend to open their contacts at the same value of current in the relay coil as that at which they close their contacts. The operation of the movement never runs beyond any point of unstable equilibrium or the like and therefore the operation of the system is reversible at all times. This characteristic introduces the serious defect that the contacts may be closed with only slight pressure so that they may be subjected to frequent and erratic opening and closing due to either slight variations in the value of the current flowing in the coil of the relay or to such mechanical disturbances as vibrations or jolts to which the apparatus may be subjected. This chattering of the contacts is undoubtedly the most serious cause of wear and deterioration of the contact surfaces because it causes sparking and arcing to take place almost continuously for comparatively long periods.

The tendency already referred to of the contacts to oppose opening and closing does not aid materially in preventing chattering because this opposition which is introduced by dirt and oil on the contacts decreases as the frequency of operation increases. Therefore the frequent opening and closing when the relay "chatters" tends to destroy any "holding" or "biasing" effect of the contact films.

In fact, "chattering" of D'Arsonval relays has proven such a serious and stubborn obstacle from the standpoint of operation alone that attempts have been made heretofore to arrange auxiliary apparatus to be sluggish in operation so that it would be incapable of responding to a "chattering operation" of the contacts of the D'Arsonval relay. This, of course does not prevent the sparking and arcing at the relay contacts themselves.

These and other difficulties are effectively overcome by the present invention which has for its object the expansion of the limitations heretofore attaching to the use of relays of the D'Arsonval type and overcoming objections and disadvantages such as those pointed out above.

It is a primary object of the present invention to utilize the small initial load current which flows when the contacts first touch to provide additional contact pressure.

A further object of my invention is to increase the accuracy of operation of sensitive relays utilizing the D'Arsonval movement.

A further object is to provide a limited amount of "feed back" or transfer of energy from the load circuit to the relay coil.

A further object is to increase the power capacity of the contacts in such a relay.

A still further object of my invention is to provide means for introducing a differential between the "turn-on" and "turn off" points of relay of the type indicated.

A further object of the present invention is to prevent the erratic opening and closing of the contacts of a relay of the type indicated.

A further object is to introduce into the operation of the relay, a characteristic analogous to that caused by a condition of unstable equilibrium in the contact mechanism.

Other objects and advantages will appear as the description proceeds.

In order to better acquaint those skilled in the art with the teachings and practice of my present invention, I shall now describe certain specific embodiments thereof, reference being had to the accompanying drawings forming a part of this specification, and in which:

Figure 1 is a combination pictorial and diagrammatic illustration of a system of the present invention; and Figures 2, 3, 4, 5 and 6 illustrate diagrammatically various other systems and modifications thereof embodying my invention.

Referring to Figure 1, a sensitive relay employing a D'Arsonval movement is indicated generally by the reference numeral 10. It comprises a permanent magnet 11 carrying pole pieces 12 which, together with a suitably mounted iron core piece 13, provide two magnetic gaps which constitute the "field" of the D'Arsonval movement. A coil 15 is positioned with one side thereof in each of the two air gaps already mentioned, and is supported at each end by pivots, the upper one of which is indicated at 16. The pivots are supported in metal pivot-bases 17 and 18 which are suitably secured to the coil as by means of insulating materials and cement. A pair of fine resilient wires 19 extend in loops from the coil to a terminal strip 20 which is mounted on the stationary bridge 25 of the relay supporting structure so as to provide convenient terminals to the coil 15 of the relay. The lower pivot base 18 carries a metal contact supporting strip 21 the opposite ends of which extend substantially radially from the pivot base. Resilient contact strips 22 and 23 of precious metal are carried by the supporting strip 21, one at each end thereof. Each contact strip is soldered at one end thereof to the support strip 21 near the pivot base and the free end of the contact strip extends along the supporting strip 21 substantially radially from the pivot base and is spaced slightly from the supporting strip 21. A pair of stationary contacts 24 and 25 carried by adjusting screws 28 and 29 are adapted to engage the free resilient ends of the contact strips 22 and 23. Secured also to the lower pivot base 18 is a spiral restoring spring 26. This spiral spring may be soldered to the strip 21 and is utilized as a means for making an electrical connection to the moving contact strips 22 and 23. The outer end of the spring 26 is soldered to an adjustable arm 27 which serves as an electrical terminal. This arm 27 may be rotated to adjust the zero position of the relay coil. The contacts 24 and 25 may be adjusted by means of their respective adjusting screws 28 and 29 to determine the amount of rotation required by the coil 15 to bring about an engagement with them of the movable contact strips 22 and 23. Obviously a setting may be provided such that the contacts (as 22 and 24) can engage so as to prevent the restoring spring 26 from bringing the coil 15 into its zero or rest position. Under these circumstances, the contacts 22 and 24 will be "normally closed" and a certain amount of current through the coil will be required to open them. As the current increases above this value, the coil will rotate against the restoring force of the spring 26 until it brings the contact 23 into engagement with the other stationary contact 25 which again limits the motion of the coil.

A light sensitive cell 30 is shown connected to the coil 15 of the relay, and a resistor 31 is connected in series therewith. The cell 30 may conveniently be of the self-generating or photo electronic type, which may be included broadly in the term of "photoelectric" cell. A cell of the self generating type will generate its own current in response to light incident upon its light sensitive surface. This current will pass through the coil 15 of the relay to operate the contacts thereof in accordance with the value of the illumination on the cell 30. Obviously, my invention is not limited to the use of a photoelectric cell or any particular type thereof, but contemplates any system capable of delivering power to a relay for operating it.

The normally closed contacts 22 and 24 are connected to control a lamp 35 which receives its power from a battery 36. The resistor 31 is connected in series with the lamp 35 and battery 36. As respects the circuit through the lamp 35, battery 36 and relay contacts, the light sensitive cell 30 and the relay coil 15 constitute a branch circuit which is in shunt with the resistor 31. The current drawn by the lamp 35 will therefore divide and flow partially through the resistor 31 and partially through the relay coil 15 and cell 30. The polarities are so chosen that the current through the relay coil 15 caused by the closing of the contact 24 is in a direction therethrough opposite to the direction of the current caused by the illumination on the light sensitive surface of the cell 30. That is, the current from the battery 36 to the coil 15 flows in that direction through the coil 15 which aids the operation of the relay by increasing the contact pressure.

The operation of the system is as follows: Assume that the light sensitive cell 30 is illuminated sufficiently to hold the contacts 22 and 24 of the relay open. As the light diminishes the current through the coil 15 diminishes and causes the contact strip 22 to engage the stationary contact 24. When mechanical engagement is first established, the contact resistance may be very high so that only a very slight load current flows therethrough. This may not be sufficient to light the lamp 35. However, this current, slight as it may be, will flow partially through the relay coil 15 in a direction opposite to that in which the current flows due to the illumination upon the cell 30. That is, it will tend to diminish the net current through the relay coil. This will immediately cause an increase of the force exerted between the closed contact surfaces, and the resultant increasing of contact pressure will generally permit a greater load current to flow through the contacts. As more current flows through the contacts, the net coil current is further reduced and the contact pressure is further increased. This "feed-back" or "self-helping" operation continues and runs to an equilibrium condition. Generally it continues until the contact resistance is low as compared to the resistance of the lamp 35. This condition constitutes a "good contact" and the lamp will burn brightly. It is thus seen that when the current through the relay coil 15 falls to such a low value as to cause the two contact surfaces to lightly touch each other, an unstable condition is established which causes the relay to instantly increase its contact pressure and cut through any insulating films on the contact surfaces so as to establish a good contact and close the lamp circuit. The current through the lamp maintains this high contact pressure. Furthermore the fact that this considerable contact pressure exists prevents erratic opening and closing of the relay due to mechanical vibrations.

As the illumination again increases on the light sensitive surface of the cell 30, the current through the relay coil 15 will be gradually increased until the algebraic sum of the current produced by the cell 30 and that produced by the battery 36 again equals the value at which the contact 24 operates (the value at which the pressure between the contact strip 18 and the stationary contact 24 is substantially equal to zero). Under this condition, the contact resistance will tend to increase, or the contact may actually open due to mechanical vibration, the current through the lamp diminishes and this in turn causes an increase of current in the coil 15 which in turn causes the contact to open. The coil again moves to an equilibrium condition and will stand with the contact strip 22 considerably separated from the stationary contact 24. In speaking of an increase and decrease of coil current, in the foregoing discussion, these terms have been used in the algebraic sense in that a current in the reverse or negative direction is considered to be less than a zero current. The positive direction of current to the relay 15 is so chosen as to be the direction which causes the contact strip 18 to move away from the stationary contact 24; that is, the direction in which the photoelectric cell 30 tends to generate current.

It will be understood that the value of the initial contact pressure developed when the current from the battery 36 of the load circuit is introduced into the coil 15 depends on the change of current 15 in the coil effected thereby. Similarly the value of the initial separation of the contacts when they open, and also the differential introduced between "turn on" and "turn off" depends upon the change of current in the coil effected by the operation of the relay contacts.

The present invention provides a relay circuit in which a differential may be established between the "turn on" and "turn off" points of a relay of the D'Arsonval type. It is to be noted that this differential does not exist in terms of current in the relay coil 15 itself since the relay is unaltered and it opens its contacts at substantially the same current value as it closes them. The differential is established between the values of illumination upon the light sensitive cell 30 which causes the relay to open and close its contacts.

Inasmuch as the "feed back" or energy transfer circuit arrangement introduces a limited instability into the operation of the relay as soon as the contact resistance begins to change, the operation may be initiated by a slight tendency of the relay contacts to chatter. This chattering or erratic operation of the relay tends to occur only under conditions of very low contact pressure or when the contacts are spaced only a very small distance apart. Thus, when the relay contacts reach a condition such that they are substantially ready to operate, under which condition they are ordinarily subject to erratic operation, the relay will operate positively and in a non erratic manner as soon as any disturbance occurs which would ordinarily produce erratic operation.

The effective elimination of chattering greatly reduces contact wear. It also materially increases the load handling capacity of the contacts because with sustained arcing eliminated the contacts stay cool at all times. In fact I have found that when using the system of my present invention, I may safely increase the load to many times the value that may ordinarily be handled by such contacts without materially increasing contact wear. And I have further found that in a system using the present invention, an increase in the load has much less affect on the life of the relay contacts than in a system not using the invention.

The value of the resistor 31 may be so chosen with respect to the value of current drawn by the lamp 35 that the difference in the illumination upon the cell 30 for opening and closing of the contacts of the relay may be substantially any value desired. Heretofore, when photoelectric equipment has been used for controlling lamps which were required to be "on" only during the hours of darkness, the operation frequently has been objectionable in that during the twilight period there would be variations of illumination such as to cause repeated on and off operation of the relay. Heretofore, attempts have been made to reduce this effect by introducing a special time delay relay between the D'Arsonval relay and the apparatus which it controls. When employing the present invention, this effect may be avoided entirely or reduced to any degree, simply by increasing the difference (as measured in terms of illumination on the cell 30) between the "turn on" and "turn off" points of the relay.

It is thus seen that the present invention accomplishes the following:

(1) It increases the accuracy and reliability of D'Arsonval relays by substantially preventing tenacious films etcetera on the relay contacts from effectively interfering with their operation.

(2) It introduces a "differential" between "turn on" and "turn off" values.

(3) It eliminates the major portion of the wear on the contacts of D'Arsonval relays, thereby increasing the life of the instrument and insuring indefinite trouble free operation.

(4) It increases the load capacity of the contacts many times.

In Figure 2, I have illustrated diagrammatically a modification of the system of Figure 1. Therein, the relay 11 has its coil 15 and contact pieces 21, 22, 23 and 24 illustrated diagrammatically. As in the system of Figure 1, the light sensitive cell 30 is connected to the coil 15 through a resistor 38 which corresponds to resistor 31 of Figure 1. As in the system of Figure 1, the light sensitive cell 30 is connected to the coil 15 through a resistor 38. As in the system of Figure 1, the lamp 35 is energized by the battery 36 and controlled by the normally closed contact comprising the contact pieces 22 and 24 of the relay. However, in the system of Figure 2, the lamp circuit does not extend through the resistor 38 but, an additional resistor 39 shunts the lamp 35. Thus, when the contacts of the relay close, current passes through the lamp 35. In addition current passes through the resistor 39, a portion of which also passes through the coil 15 of the relay in such a direction as to oppose the current produced by the light sensitive cell 30. The operation of the system of Figure 2 is substantially like that of the system of Figure 1. The system of Figure 2 has the advantage that the amount of the "feed back" or transfer current, that is, the value of the current passing through the coil 15 from the battery 36, is substantially independent of the current drawn by the lamp 35. This is of advantage when a definite differential between "turn-on" and "turn-off" is required and the capacity of the lamps may be changed. The system of Figure 1 presents the advantage over this system of Figure 2 of being somewhat more efficient in operation. It sometimes is a distinct disadvantage to introduce any great value of resistance in the series with the cell 30 and coil 15 because it reduces the current output of the cell. In the system of Figure 1, the entire current of the lamp 35 is passed through the resistor 31 so that the desired value of transfer current through the coil 15 may be obtained with a relatively small value of resistance. Obviously, when the current drawn from the battery through the resistor 31 is decreased, the resistance value thereof has to be greater in order to provide the same value of transfer current in the relay coil 15. Thus in the system of Figure 2, unless the resistor 39 draws a current substantially equal to that of the lamp, the resistor 38 must have a relatively higher value than that of the resistor 31 in the system of Figure 1. Inasmuch as contacts of relays of this type are limited in size, it is desirable to keep the current which is handled by the contacts as low as possible. The current drawn by the resistors 38 and 39 of course represents an addition to the current drawn by the lamp 35 in the system of Figure 2. This is avoided in the system of Figure 1.

Figure 3 illustrates diagrammatically a modification of the system of Figure 2. The coil of the relay illustrated in Figure 3 comprises two windings 41 and 42 which are insulated from each other. The winding 41, which preferably will occupy most of the winding space is connected to the light sensitive cell 30. The other winding 42 is connected in series with a resistor 43, the branch circuit consisting of the winding 42 and the resistor 43 being shunted across the lamp 35. The operation is similar to the system of Figure 2 with the exception that the "feed back" or transfer current is passed not through the photoelectric cell and winding 41 associated therewith, but through the separate winding 42. The current through the winding 42 will react with the magnetic field of the relay in the same manner as the current through the winding 41 and produce a rotative effort in the coil in addition to that produced by the current in the winding 41.

The arrangement of Figure 3 is sometimes desirable in that it permits the separate coil sections 41 and 42 to be separately designed to match their respective circuits. This may be desirable, for example, when the circuit which controls the D'Arsonval relay supplies a voltage to the relay coil which is not small compared to the voltage of the battery 36. The arrangement of Figure 3 also eliminates the resistor in series with the coil of the relay.

Figure 4 illustrates diagrammatically a system in which the use of a resistor in series with the light sensitive cell and the coil of the relay is eliminated so as to avoid the decrease in cell output incident thereto. Instead of introducing a voltage drop across a series resistor as in the system of Figures 1 and 2, the connections for the energy transfer from the battery circuit are made directly to the terminals of the coil of the relay. This in effect provides a shunt connection to the coil rather than a series connection. This arrangement is especially advantageous when the circuit conditions are such that the resistor (48) may have a resistance value which is very high compared to the resistance of the relay coil 15. Operating features of the arrangement of Figure 4 are clear without detailed description thereof.

In Figure 5 the photoelectric cell 30 is connected directly across the terminals of the coil 15 of the relay 11. Connected also directly across the terminals of the relay 15 is the center tapped shunt comprising resistors 53 and 54. The center tap is connected through the battery 36 and normally closed push button switch 55 to the moving contact strip 22 of the relay. A load circuit comprising the coil 56 of a relay shunted by a spark suppressing resistor 57 is connected between one end of the resistor 53 (the end which is connected to a terminal of the coil 15) and the stationary contact member 24. Similarly another load circuit comprising the coil 58 of another relay shunted by a spark suppressing resistor 59 is connected between the resistor 54 and the stationary contact member 23. When the contacts 22 and 24 close, the current from the battery 36 passes through the resistor 53, thence through the load circuit comprising the relay 56 and its resistor 57, thence through contacts 22 and 24 and normally closed push button 55 back to the battery 36. A part of this current will flow through the relay coil 15, etcetera, which shunt the resistor 53, the current through the coil 15 being in the direction opposite to the direction of the current produced therein by the light sensitive cell 30. When the contacts 21 and 23 are closed, the current flows through the resistor 54, and the load circuit comprising the relay 58. As before, a part of the current will flow through the coil 15 of the relay; but this time it flows in the same direction therethrough as the current produced therein by the light sensitive cell 30.

Obviously, the load circuits as shown can be replaced by any other suitable load circuit, or the auxiliary relays shown in the circuit can be employed in any suitable known manner to control any other apparatus by means of circuits of which the conductors shown may form a part.

Under certain conditions it may be desired to adjust the relay to have a very small difference in current value between the closing point of contacts 21 and 23 and the closing point of contacts 22 and 24. If this difference is less than the current component produced in the coil 15 by the energy transfer arrangement, it would be impossible for the coil of the relay 15 ever to assume a condition wherein both the contact gaps would be open simultaneously. As has already been explained in connection with the system of Figure 1, when the contacts 22 and 24 begin to separate, the current through the relay coil 15 immediately increases by an amount equal to the current component derived from the transfer of energy from the battery 36. In so doing, the coil moves so as to carry the moving contact strip 22 away from the stationary contact piece 24 and so as to carry the moving strip 21 towards the contact 23. If upon the opening of the contacts 22 and 24 the current increases more than the amount required to carry the contact piece 21 over into engagement with the contact piece 23 that contact will necessarily close as a result of the opening of the contacts 22 and 24. A similar operation would be obtained when the contacts 21 and 23 opened. Therefore, the push button 55 is provided so that it may be opened when it is desired to permit the relay 11 to return to such a position that both the contact gaps are open. By opening the push button 55 the circuit of the battery 56 is opened and this necessarily prevents all transfer of energy from the battery 36 to coil 15. Upon closing the push button 55 nothing will happen inasmuch as both the contact gaps will be in open positions.

Figure 6 illustrates the manner in which my invention may be used in a system employing a special latch type relay. The latch relay itself and the circuit in which it operates are described and claimed in the co-pending applications of Karl H. Sommermeyer, Ser. No. 64,262, filed February 17, 1936, and Serial No. 64,263, filed February 17, 1936.

This latch relay which is designated generally by the reference numeral 75 comprises a pair of electromagnets 77 and 78 provided with armatures 79 and 80 respectively. The two electric magnets 77 and 78 are each secured to a non-magnetic strap 81 which holds them fixed with respect to each other. These armatures are provided with non-magnetic bars 83 and 84 which interfere so as to block or latch each other. This latching operation takes place as follows:

The armature 79 of the magnet 77 is shown in a drawn up or actuated position. The armature 80 of the magnet 78 is in its released position and its bar 84 locks the motion of the bar 83 so as to prevent the armature 79 of the magnet 77 from moving out of this drawn up or actuated position. When the magnet 78 is energized so as to draw up this armature 80, the bar 84 moves out of the way of the bar 83 and permits the armature 79 of the magnet 77 to move to its released position. In so doing, the armature 79 moves its bar 83 so as to block the motion of the bar 84 and thereby prevent the armature 80 of the magnet 78 from returning to its released position when the coil thereof is deenergized.

The armature 79 of the magnet 77 operates a set of normally open contacts 87 which are connected in series with the coil of the magnet 78. A similar set of normally open contacts 88 operated by the armature 80 of the magnet 78 is connected in series with the coil of the magnet 77. Additional contacts 89 and 90 may be operated by the armatures 79 and 80 to control load circuits in any known manner.

The coil 15 of the D'Arsonval relay 11 is connected in series with the light sensitive cell 30 and resistors 61 and 62. The center tap between the resistors 61 and 62 is connected to one terminal of the battery 36. The other terminal of the battery 36 is connected to the moving contacts 21 and 22 of the relay 10. The stationary contact 23 of the relay 11 is connected through the contacts 88 to the coil of the magnet 77, the circuit extending therefrom to one end of the resistor 62. Similarly the stationary contact 24 of the relay 11 is connected through the contact 87 to the coil of the magnet 78, the circuit extending therefrom to the resistor 61. Spark suppressing resistors 91 and 92 are shunted across the terminals of coils 78 and 79 respectively.

When the latch relay is in the position shown in the drawings, the contacts 88 are open so that should the illumination from the light sensitive cell 30 increase to such a value to cause the contacts 21 and 23 to close, no current will flow therethrough because the circuit is open at the contacts 88. However, when the illumination decreases to such a value as to cause the contacts 22 and 24 to close, current passes from the battery 36 through the resistor 61, thence through the coil of the relay 78, thence through the contacts 87 and contact 24 back to the battery. The passage of the current through the resistor 61 also causes the current to flow through the coil 15 of the relay 11 from the battery so as to provide a considerable contact pressure between the strip 22 and the stationary contact piece 24 to provide a good low resistance contact. The current through the coil of the magnet 78 causes the magnet to draw up its armature 80 so as to release the armature 79 of the magnet 77. The armature 77 in moving to its released position opens its contact 87 thereby de-energizing the magnet 78. However, at the time when the magnet 78 becomes de-energized, its armature is latched or blocked so as to prevent it from moving out of its drawn up position. In opening the circuit at the contacts 87 the current flowing in the coil 15 from the battery 36 is also terminated.

While I have shown and described certain particular embodiments of my invention, it will be understood that the same are by way of illustration only. Thus certain advantages of the invention may be had when employing relays other than the D'Arsonval type. Moreover, while I have for purposes of illustration shown the relay operated by a particular type of photoelectric cell for the purpose of controlling lighting circuits, it is to be understood that the relay may be made to respond to any other primary control device capable of operating it and that any suitable type of circuit or apparatus may be controlled thereby without departing from my invention. Therefore, I do not wish to be limited except by the scope of the appended claims.

I claim:

1. In combination a relay of the D'Arsonval type having a coil and contacts, primary control means for controlling and operating said relay, a load circuit for said relay including said contacts, a power supply separate from said control means in said load circuit, and means comprising connections between said load circuit and the coil of the relay for adapting said power supply to supply current to said relay coil, and for adapting said contacts to control the supply of current from said power supply to said coil so that an operation of said contacts produces a change of current in said coil, the power supply being so connected with respect to the polarity thereof that when said contacts close, the change of current thereby caused in the relay coil acts to increase the pressure between the contact surfaces.

2. In combination a relay having a coil and contacts, primary control means for controlling and operating said relay in accordance with an electrical condition of said primary control means, a load circuit for said relay including said contacts, a power supply separate from said primary control means in said load circuit, and means comprising connections between said load circuit and the coil of the relay for adapting said power supply to supply current to said relay coil, and for adapting said contacts to control the supply of current from said power supply to said coil so that an operation of said contacts produces a change of current in said coil, the power supply being so connected with respect to the polarity thereof that when a change of said electrical condition in one direction causes an increase of current in the relay coil to such an extent as to operate the relay, the current in said relay coil is further increased by the switching of the load circuit to maintain the relay in its operated condition and to prevent operation in the opposite direction until said electrical condition changes in the opposite direction by an amount in excess of the change required by the characteristics of the relay alone.

3. In combination a relay having a coil and contacts, said relay being of a type whose contact pressure depends at least in part upon the value of the current traversing its coil, a coil circuit including said coil and including also control means for supplying current to said coil for controlling and operating the relay, a load circuit controlled by said relay and including said contacts, a power supply in said load circuit and separate from said control means and means comprising connections between said load circuit and the control circuit of the relay for supplying current from said power supply to said relay coil and for adapting said relay contacts in the load circuit, by their operation, to alter the magnitude of said current so supplied from said power supply to the relay coil, said power supply being so connected with respect to the polarity thereof that when said contacts close, the change of current caused thereby in the relay coil acts to increase the pressure between the contact surfaces.

4. In combination, a relay having a coil and contacts, said relay being of a type whose contact pressure depends at least in part upon the value of the current traversing its coil, a coil circuit including said coil and including also control means for supplying current to said coil for controlling and operating the relay, a load circuit for said relay established by closing said contacts, a power supply in said load circuit and separate from said control means and means comprising connections between said load circuit and the coil circuit of the relay for supplying current from said power supply to said relay coil when said contacts are closed, said current traversing said coil in such a direction as to increase the pressure between the engaging contact surfaces.

5. In combination a relay of the D'Arsonval type having a coil and contacts, a photoelectric cell of the self-generating type, a resistor, said coil, photoelectric cell and resistor being connected in series to constitute a control circuit, a power supply and a load device, said relay contacts, power supply, load device and resistor being connected in series to constitute a load circuit, whereby an operation of the contacts causes a change of current in said control circuit, said power supply being so connected with respect to the polarity thereof that when said load circuit is closed by the relay contacts the change of current in the relay coil acts to increase the contact pressure.

6. In combination a relay having a coil and contacts, a primary control means for supplying current to said coil for controlling and operating the relay, a power supply, a load device, said power supply, load device, relay contacts and relay coil being connected in series to constitute a load circuit, whereby an operation of the contacts causes a change of current in said relay coil, said power supply being so connected with respect to the polarity thereof that when said primary control means causes an increase of current in the relay coil to such an extent as to operate the relay contacts, the current in the coil is further increased by the operation of the contacts to maintain the relay in its operated condition and to prevent an opposite operation until the current decreases an amount in excess of the decrease required by the inherent characteristics of the relay itself.

7. In combination a relay having a coil and contacts, control means for supplying current to said coil for controlling and operating the relay, a power supply separate from said control means, a circuit comprising said power supply and relay contacts, and means comprising connections between said circuit and the coil of the relay for supplying current from said power supply to said relay coil and for adapting said relay contacts in said circuit to control the magnitude of the current so supplied from said power supply to said relay coil, said power supply being so connected with respect to the polarity thereof that when the relay operates in response to an increase of current in the relay coil, the current in said coil is further increased by the operation of the contacts to maintain the relay in its operated condition and to prevent an opposite operation until the current in the coil decreases an amount in excess of the decrease required by the inherent characteristics of the relay alone.

8. In combination a relay having two coils each of which is separately adapted to operate the relay, contacts on said relay, primary control means for supplying current to one of said coils for controlling and operating the relay, a load circuit including said contacts, a power supply and a load device in said load circuit and means for directing at least a part of the load current through the other coil of the relay.

9. A relay having a coil and contacts said relay being of a type such that the separation between its contact surfaces depends at least in part upon the value of the current traversing its coil, control means for supplying current to said coil for controlling and operating the relay, a power supply separate from said control means, a load device, a load circuit including said contacts, power supply and load device, and means comprising connections between said load circuit and the coil of the relay for supplying current from said power supply to the coil of the relay, and for adapting said relay contacts to control the magnitue of the current so supplied from said power supply to the coil of the relay, said connections being so arranged with respect to the polarity of said power supply that when said contacts open, the change of current caused thereby in the relay coil tends to increase the separation of the contact surfaces.

ARCHIE J. McMASTER.